United States Patent
Gong et al.

(10) Patent No.: US 10,422,690 B2
(45) Date of Patent: Sep. 24, 2019

(54) METHODS AND DEVICES FOR AMBIENT LIGHT ACQUISITION AND ANALYSIS

(71) Applicant: OPPLE LIGHTING CO., LTD., Shanghai (CN)

(72) Inventors: Xingzhi Gong, Shanghai (CN); Yalong Liu, Shanghai (CN)

(73) Assignee: Oppie Lighting Co., Ltd., Shanghai (CN)

( * ) Notice: Subject to any disclaimer, the term of this patent is extended or adjusted under 35 U.S.C. 154(b) by 162 days.

(21) Appl. No.: 15/665,889

(22) Filed: Aug. 1, 2017

(65) Prior Publication Data

US 2017/0328766 A1 Nov. 16, 2017

Related U.S. Application Data

(63) Continuation of application No. PCT/CN2016/085688, filed on Jun. 14, 2016.

(30) Foreign Application Priority Data

Jun. 30, 2015 (CN) .......................... 2015 1 0373893
Jun. 30, 2015 (CN) ..................... 2015 2 0461672 U

(51) Int. Cl.
*H04L 29/06* (2006.01)
*G01J 1/02* (2006.01)
(Continued)

(52) U.S. Cl.
CPC ............... *G01J 1/0219* (2013.01); *G01J 1/00* (2013.01); *G01J 1/0228* (2013.01);
(Continued)

(58) Field of Classification Search
CPC .......... G01J 1/0219; G01J 1/4204; G01J 3/00; G01J 3/0264; G01J 3/50; G06F 1/3234;
(Continued)

(56) References Cited

U.S. PATENT DOCUMENTS 6,493,084 B1 * 12/2002 Friend ....................... G01J 3/02
356/319
8,115,448 B2 * 2/2012 John .................... A61N 1/3785
320/108

(Continued)

FOREIGN PATENT DOCUMENTS

CN 102694406 A 9/2012
CN 104079655 A 10/2014
(Continued)

OTHER PUBLICATIONS

International Search Report (including English translation) issued in corresponding International Application No. PCT/CN2016/085688, dated Aug. 26, 2016, 7 pages.

(Continued)

*Primary Examiner* — Ahmed Elallam
(74) *Attorney, Agent, or Firm* — Arch & Lake LLP

(57) ABSTRACT

Embodiments of the present disclosure disclose an ambient light acquisition method, an ambient light acquisition device, and an ambient light analysis method. An ambient light acquisition method includes acquiring an ambient light parameter of a target area, converting the ambient light parameter into a protocol type parameter in accordance with a predetermined wired communication protocol; and transmitting the protocol type parameter to an ambient light analysis device through a wired communication route corresponding to the predetermined wired communication protocol.

20 Claims, 4 Drawing Sheets

(51) Int. Cl.
*G01J 1/42* (2006.01)
*G01J 3/50* (2006.01)
*G06F 1/32* (2019.01)
*H02J 7/00* (2006.01)
*G01J 1/00* (2006.01)
*G01J 3/00* (2006.01)
*G06F 1/3234* (2019.01)
*G01J 3/02* (2006.01)

(52) U.S. Cl.
CPC ............... *G01J 1/4204* (2013.01); *G01J 3/00* (2013.01); *G01J 3/0264* (2013.01); *G01J 3/50* (2013.01); *G06F 1/3234* (2013.01); *H04L 69/08* (2013.01); *H02J 7/0052* (2013.01)

(58) Field of Classification Search
CPC ..... G06F 1/3206; G06F 1/3209; H04L 69/08; H02J 2007/0062
See application file for complete search history.

(56) References Cited

U.S. PATENT DOCUMENTS

2014/0168225 A1 6/2014 Ohwaki et al.
2015/0070701 A1* 3/2015 Jou ................. G01J 1/0219
356/408

FOREIGN PATENT DOCUMENTS

| CN | 204085690 U | 1/2015 |
| CN | 104977081 A | 10/2015 |
| CN | 204903001 U | 12/2015 |

OTHER PUBLICATIONS

Written Opinion issued in corresponding International Application No. PCT/CN2016/085688, dated Aug. 26, 2016, 6 pages.

* cited by examiner

METHODS AND DEVICES FOR AMBIENT LIGHT ACQUISITION AND ANALYSIS

CROSS-REFERENCE TO RELATED APPLICATIONS

This application is based upon and claims the priority of PCT patent application No. PCT/CN2016/085688 filed on Jun. 14, 2016 which claims the priority of Chinese Patent Application No. 201510373893.9 filed on Jun. 30, 2015, and Chinese Patent Application No. 201520461672.2 filed on Jun. 30, 2015, the entire contents of all of which are hereby incorporated by reference herein for all purposes.

TECHNICAL FIELD

The present disclosure relates to the technical field of illumination, in particular relates to methods and devices for ambient light acquisition and analysis.

BACKGROUND

With the rapid development of illumination technologies, the number of illumination devices around people is also steadily increased. Due to inconsistency of the illumination purposes, parameters such as a luminous intensity and color of irradiated light emitted by various illumination devices are also very different. Polluted light that can affect health of the human eye can be easily generated after the mixing of the irradiated light emitted by a plurality of illumination devices with different illumination objectives.

SUMMARY

Embodiments of the present disclosure provide methods for ambient light acquisition and analysis and the ambient light acquisition devices.

An ambient light acquisition method is provided in the present disclosure. The ambient light acquisition method may include acquiring an ambient light parameter of a target area, converting the ambient light parameter into a protocol type parameter in accordance with a predetermined wired communication protocol, and transmitting the protocol type parameter to an ambient light analysis device through a wired communication route corresponding to the predetermined wired communication protocol.

An ambient light acquisition device is also provided in the present disclosure. The ambient light acquisition device may include a parameter acquisition circuit configured to acquire an ambient light parameter of a target area, a parameter conversion circuit configured to convert the ambient light parameter into a protocol type parameter in accordance with a predetermined wired communication protocol, and a parameter sending circuit configured to send the protocol type parameter to the ambient light analysis device through a wired communication route corresponding to the predetermined wired communication protocol.

An ambient light analysis method is further provided in the present disclosure. The ambient light analysis method may include: receiving a protocol type parameter from an ambient light acquisition device through a wired communication route where the wired communication route may include a predetermined wired communication protocol, and obtaining an ambient light analysis result by comparing the protocol type parameter with a preset ambient light threshold It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

Figure 1:
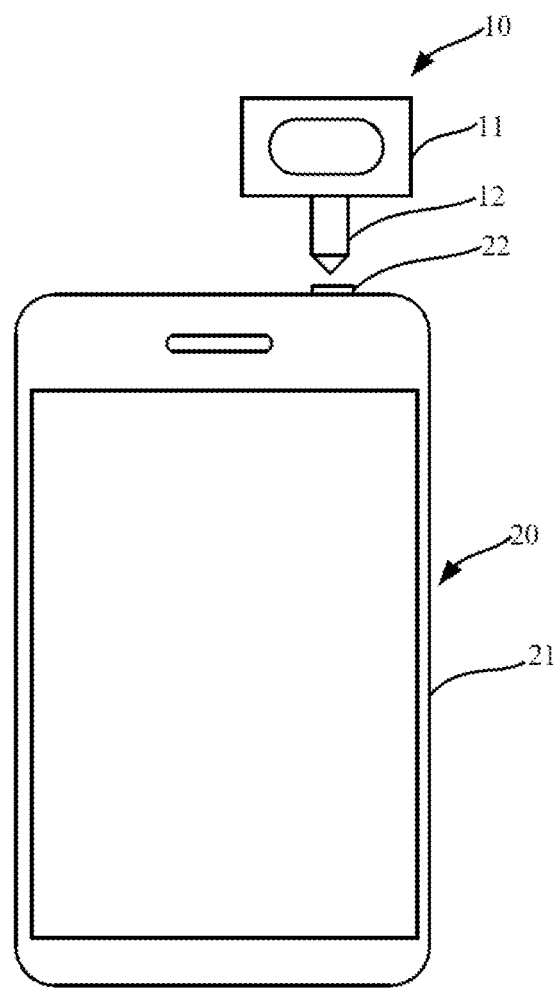
FIG. 1 is a schematic structural view of an ambient light detection system provided by an embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Embodiments of the present disclosure provide ambient light acquisition and analysis methods and corresponding devices.

In order to enable those skilled in the art to understand the technical solutions in the embodiments of the present disclosure more clearly, the technical solutions of the embodiments of the present disclosure will be described in a clearly and fully understandable way in connection with the drawings related to the embodiments of the disclosure. The described embodiments are just a part but not all of the embodiments of the present disclosure. Based on embodiments of the present disclosure, embodiments obtained by those skilled in the art without making other inventive work should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In general, whether the ambient light is polluted light may be generally detected by the following steps:

S1: obtaining ambient light parameter such as a luminous intensity and color by detecting the ambient light via a professional optical detection device;

S2: transmitting, by the optical detection device, the detected ambient light parameter to a professional optical analysis device through wireless communication manners such as WIFI and Bluetooth; and S3: comparing, by the optical analysis device, relevant parameters of safe illumination that the human eyes can bear to the detected ambient light parameter, and obtaining a comparison result, where the comparison result may be configured to reflect whether the ambient light is polluted light.

However, at least following problems exist for the above method: as the detection of the ambient light depends closely on the professional optical detection device and the professional optical analysis device, and the optical detection device and the optical analysis device perform data communication with each other by wireless communication manners such as WIFI and Bluetooth, there is a high requirement on the surrounding environment. If there is large electromagnetic signal interference in the surrounding environment, perfection of data transmission between the two devices cannot be guaranteed. Moreover, the cost of a wireless transmission module such as WIFI and Bluetooth is high, which increases the difficulty in the popularization of the ambient light detection device.

Thus, during the process of detecting ambient light by a professional optical detection device and a professional optical analysis device that have wireless communication capability, the optical detection device and the optical analysis device may have problems such as poor stability in transmission of ambient light parameter and a too high equipment cost. Embodiments of the present disclosure provide an ambient light detection method for solving the foregoing problems. Detailed description will be given below to the method with reference to the accompanying drawings.

FIG. 1 is a schematic structural view of an ambient light detection system provided by an embodiment of the present disclosure.

The ambient light detection system comprises an ambient light acquisition device 10 and an ambient light analysis device 20 which are cooperatively coupled to each other.

The ambient light acquisition device 10 includes a main body 11 for accommodating a plurality of sensors such as a light sensor, a color temperature sensor and a color sensor, etc., and a headphone plug 12 which is cooperatively coupled to the ambient light analysis device 20.

The ambient light analysis device 20 may be a smart mobile phone or a tablet PC and includes a body 21 and a headphone jack 22 disposed on the body 21. The headphone plug 12 on the ambient light acquisition device may be inserted into the headphone jack 22, so as to achieve electrical connection between the ambient light acquisition device and the ambient light analysis device. The ambient light analysis device 20 may further include conventional components such as a mobile communication module, a display module and a battery management module, etc.

In other embodiments of the present disclosure, the headphone plug 12 and the main body 11 may also be connected by a long wire. For instance, when the user needs to detect ambient light in an area at a high position, the ambient light acquisition device 10 may be fixed at the position to acquire the ambient light, and a user operates the ambient light acquisition device 10 through the ambient light analysis device 20 in a safer area.

Or even the headphone plug 12 may also be adjusted to be a USB plug or another connection, including a so-called lightning plug, so that the ambient light acquisition device 10 can be electrically connected with the ambient light analysis device 20 provided with a USB interface or another interface, including a lightning interface.

Figure 2:
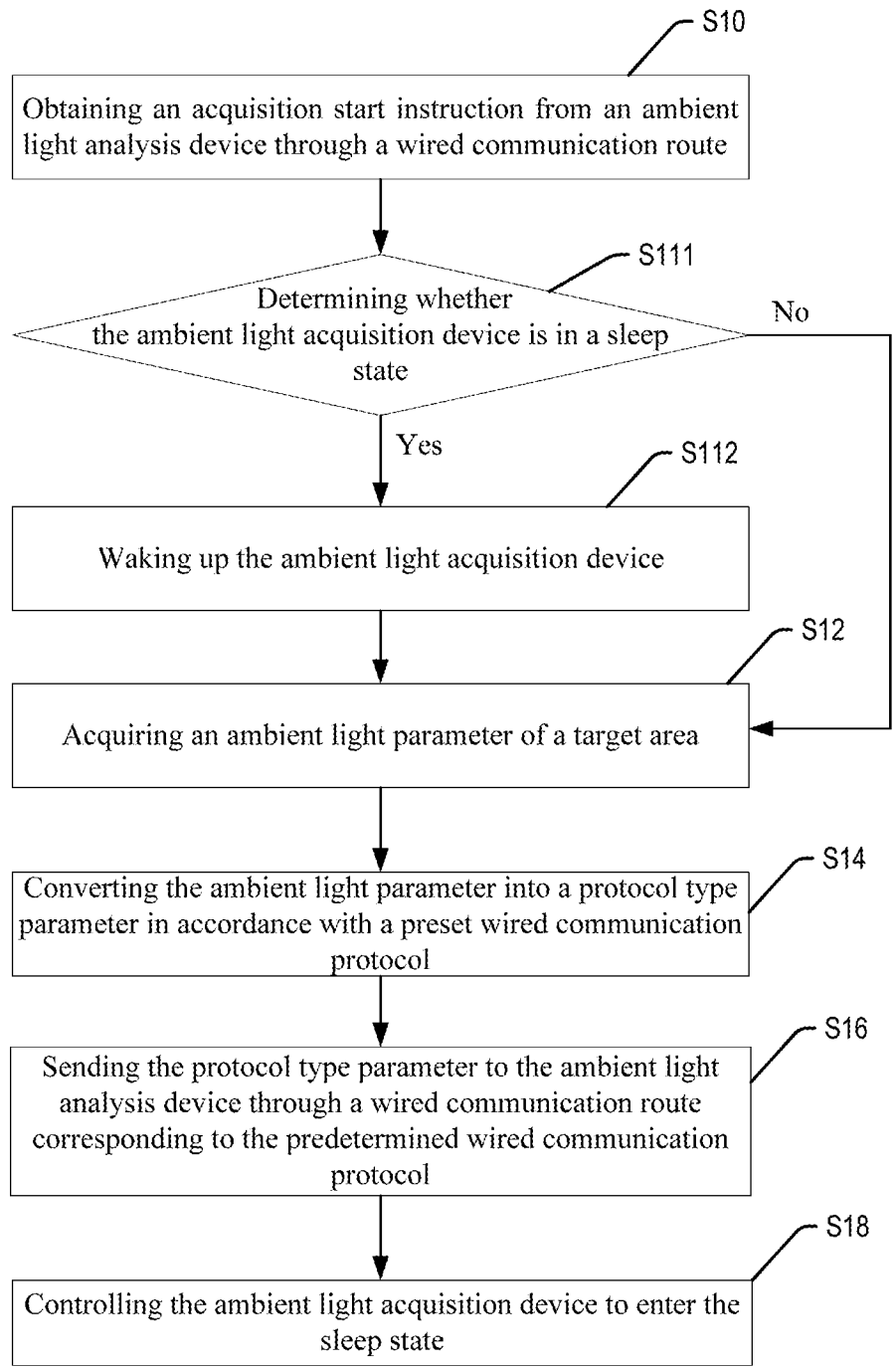
FIG. 2 is a flow diagram of an ambient light acquisition method provided by an embodiment of the present disclosure.

FIG. 2 is a flow diagram of an ambient light acquisition method provided by an embodiment of the present disclosure. An execution entity of the acquisition method may be the ambient light acquisition device 10.

The ambient light acquisition method comprises the following steps.

At S12, a non-limiting example of the method may begin by acquiring an ambient light parameter of a target area. In embodiments of the present disclosure, the target area may be set according to acquisition needs of users. For instance, in an outdoor environment, as the number of possible illumination devices may be plentiful, the target area may be set to be a large wide-angle area, so as to acquire ambient light which conforms to the current illumination environment more; and in an indoor environment, the target area may be set to be a small narrow-angle area, so as to improve the acquisition efficiency of ambient light.

The ambient light parameter may include at least one of a luminous intensity parameter, a color temperature parameter or a color parameter. The specific composition of the ambient light parameter may be set according to the surrounding illumination environment. For instance, in an illumination environment with various searchlights having a high luminous intensity, the ambient light parameter may only include the luminous intensity parameter. In an illumination environment with various color lights of different colors, the ambient light parameter may only include the color parameter.

In embodiments of the present disclosure, in order to be adapted to various different illumination environments, the ambient light parameter may also include the three of the luminous intensity parameter, the color temperature parameter and the color parameter. No matter how the composition types of the ambient light parameter are varied, corresponding parameters may be detected by a corresponding combination of the illumination sensor, the color temperature sensor and the color sensor. This technology is well-known by those skilled in the art.

At S14, this non-limiting example method may continue by converting the ambient light parameter into a protocol type parameter in accordance with a predetermined wired communication protocol. In embodiments of the present disclosure, the predetermined wired communication interface includes a headphone interface protocol, a USB interface protocol or a lightning interface protocol.

Taking the headphone interface protocol as an example, the obtained ambient light parameter is converted into a protocol type parameter that conforms to the headphone interface protocol, namely an audio signal parameter. Both the ambient light parameter and the protocol type parameter are embodied in electrical signals. An electrical signal, obtained after conversion and taken as the protocol type parameter, conforms to the headphone interface protocol, and may be transmitted through the headphone interface.

When the predetermined wired communication protocol is a protocol of another type, the ambient light parameter is just needed to be converted according to the corresponding protocol.

At S16, the non-limiting method may include sending the protocol type parameter to the ambient light analysis device through a wired communication route corresponding to the predetermined wired communication protocol. As the protocol type parameter conforms to the predetermined wired communication protocol, the protocol type parameter may be transmitted to the ambient light analysis device through the route. The ambient light analysis device may be a smart mobile phone, a tablet PC or other devices, has certain data analysis capability, and provides convenience for subsequent analysis of the protocol type parameter, so that the user can make clear of the ambient light parameter.

Still taking the case that the predetermined wired communication protocol is the headphone interface protocol as an example, the wired communication route is an audio data transmission route. The transmission route at least includes a headphone plug and a headphone jack which are cooperatively coupled to each other. As the wired communication route has the advantage of stable signal transmission, the data transmission between the ambient light acquisition device and the ambient light analysis device can be guaranteed, and a restrictive requirement on the transmission environment in a process of data transmission through a wireless communication route such as WIFI and Bluetooth can be avoided.

Meanwhile, as a headphone plug line has a simple structure and low production cost, the production cost of the ambient light acquisition device can be greatly reduced. Preferably, the headphone interface protocol may be a 3.5 mm headphone interface protocol widely applied in the industry, so that the ambient light acquisition device can be matched and used with multiple types of ambient light analysis devices.

In embodiments of the present disclosure, before the step S12, the ambient light acquisition method further comprises step S10, which may include obtaining an acquisition start instruction from the ambient light analysis device through the wired communication route.

After the ambient light acquisition device obtains the acquisition start instruction, the steps S12 to S16 are begun to be executed. As the ambient light analysis device such as a smart mobile phone has been popularized currently, a user already has considerable operation experience in the smart mobile phone, so that the user can proficiently connect the ambient light analysis device with the ambient light acquisition device by the wired approach, and can operate the ambient light acquisition device through the ambient light analysis device.

For instance, the acquisition start instruction may include information about a type of the ambient light to be acquired, so that the ambient light acquisition device can acquire the type of the ambient light preset by the user, and hence the pertinence of ambient light acquisition can be improved.

In embodiments of the present disclosure, the ambient light acquisition device may be operated through a client APP on a mobile terminal which serves as the ambient light analysis device, and the user may select a plurality of control parameters such as a type of the ambient light to be acquired and an acquisition time of the ambient light through the client APP. Compared with the professional ambient light acquisition device, the ambient light acquisition method provided by the embodiments of the present disclosure has the advantage of quick start.

In other embodiments of the present disclosure, a special start button may also be set on the ambient light acquisition device, and the start button is operated to cause the ambient light acquisition device to begin execution of the steps S12 to S16.

In embodiments of the present disclosure, the ambient light acquisition method further comprises the following steps between the steps S10 and S12.

At S111, the method may include determining whether the ambient light acquisition device is in a sleep state; if so, executing the step S12 after executing the step S112; and if not, directly executing the step S12. At S112, the method may include waking up the ambient light acquisition device.

The ambient light acquisition device may be set to automatically enter the sleep state when not used within a preset duration; or the user manually controls the ambient light acquisition device to enter the sleep state.

In embodiments of the present disclosure, after the acquisition start instruction is obtained through the step S10, the state of the ambient light acquisition device is determined through the step S11, and the ambient light acquisition device in the sleep state is waken up, so as to avoid a startup latency caused by the sleep of the device from affecting the user experience.

In other embodiments of the present disclosure, the ambient light acquisition method may only comprise the steps S111 to S16, and the ambient light acquisition device does not need to be started only after the acquisition of the acquisition start instruction. For instance, periodical startup of the ambient light acquisition device may be set, and the step S111 is directly entered after each startup. The ability to acquire the ambient light may be achieved as well.

In embodiments of the present disclosure, the ambient light acquisition method may further comprise the following step after the step S16. Specifically, at S18 the method may include controlling the ambient light acquisition device to enter the sleep state. After finishing the ambient light acquisition operation each time, the ambient light acquisition device automatically enters the sleep state, so that the energy consumption of the device can be reduced.

In other embodiments of the present disclosure, the ambient light acquisition method may also not comprise the step S18, so that the ambient light acquisition device will not automatically enter the sleep state and can be on call at any time.

In embodiments of the present disclosure, the ambient light acquisition method can further comprise the following steps:

determining whether remaining power of the ambient light acquisition device is lower than a preset power threshold;

if so, generating a charging request instruction; and sending the charging request instruction to the ambient light analysis device through the wired communication route.

Subsequently, the ambient light analysis device supplies power for the ambient light acquisition device through the wired communication route, so as to ensure the working duration of the ambient light acquisition device.

In a process of charging batteries in the ambient light detection system through an independent charging interface, a charging instruction is sent through the independent charging interface and does not need to be sent through the wired communication route.

Figure 3:
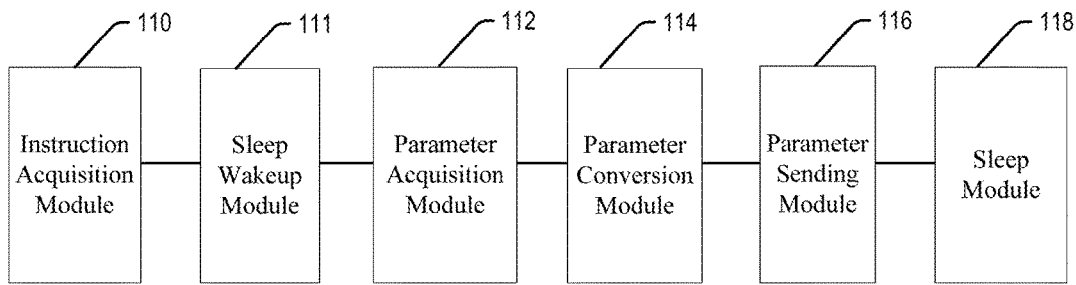
FIG. 3 is a block diagram of an ambient light acquisition device provided by an embodiment of the present disclosure.

FIG. 3 is a block diagram of an ambient light acquisition device provided by an embodiment of the present disclosure. The ambient light acquisition device comprises the following modules.

A parameter acquisition module 112 is configured to acquire an ambient light parameter of a target area. In embodiments of the present disclosure, the target area may be set according to acquisition needs of users. For instance, in an outdoor environment, as the number of possible illumination devices may be plentiful, the target area may be set to be a large wide-angle area, so as to acquire ambient light which conforms to the current illumination environment more; and in an indoor environment, the target area may be set to be a small narrow-angle area, so as to improve the acquisition efficiency of ambient light.

The ambient light parameter may include at least one of a luminous intensity parameter, a color temperature parameter or a color parameter. The specific composition of the ambient light parameter may be set according to the surrounding illumination environment. For instance, in an illumination environment with various searchlights having a high luminous intensity, the ambient light parameter may only include the luminous intensity parameter. In an illumination environment with various color lights of different colors, the ambient light parameter may only include the color parameter.

In embodiments of the present disclosure, in order to be adapted to various different illumination environments, the ambient light parameter may also include the three of the luminous intensity parameter, the color temperature parameter and the color parameter. No matter how the composition types of the ambient light parameter are varied, corresponding parameters may be detected by a corresponding combination of the illumination sensor, the color temperature sensor and the color sensor. This technology is well-known by those skilled in the art.

A parameter conversion module 114 is configured to convert the ambient light parameter into a protocol type parameter in accordance with the predetermined wired communication protocol. In embodiments of the present disclosure, the predetermined wired communication interface includes a headphone interface protocol, a USB interface protocol or a lightning interface protocol.

Taking the headphone interface protocol as an example, the obtained ambient light parameter is converted into a protocol type parameter that conforms to the headphone interface protocol, namely an audio signal parameter. In an operation process of the system, both the ambient light parameter and the protocol type parameter are embodied in electrical signals. An electrical signal, obtained after conversion and taken as the protocol type parameter, conforms to the headphone interface protocol, and may be transmitted through the headphone interface. When the predetermined wired communication protocol is a protocol of another type, the ambient light parameter is just needed to be converted according to the corresponding protocol.

A parameter sending module 116 is configured to send the protocol type parameter to the ambient light analysis device through a wired communication route corresponding to the predetermined wired communication protocol. As the protocol type parameter conforms to the predetermined wired communication protocol, the protocol type parameter may be transmitted to the ambient light analysis device through the route. The ambient light analysis device may be a smart mobile phone, a tablet PC or other devices, has certain data analysis capability, and provides convenience for subsequent analysis of the protocol type parameter, so that the user can make clear of the ambient light parameter.

Still taking the case that the predetermined wired communication protocol is the headphone interface protocol as an example, the wired communication route is an audio data transmission route. The transmission route at least includes a headphone plug and a headphone jack which are cooperatively coupled to each other. As the wired communication route has the advantage of stable signal transmission, the data transmission between the ambient light acquisition device and the ambient light analysis device can be guaranteed, and a restrictive requirement on the transmission environment in a process of data transmission through a wireless communication route such as WIFI and Bluetooth can be avoided. Meanwhile, as a headphone plug line has a simple structure and low production cost, the production cost of the ambient light acquisition device can be greatly reduced. Preferably, the headphone interface protocol may be a 3.5 mm headphone interface protocol widely applied in the industry, so that the ambient light acquisition device can be matched and used with multiple types of ambient light analysis devices.

In embodiments of the present disclosure, the ambient light acquisition device further comprises an instruction acquisition module 110. Before the parameter acquisition module 112 acquires the ambient light parameter of the target area, the instruction acquisition module is configured to: obtain an acquisition start instruction from the ambient light analysis device through the wired communication route.

After the ambient light acquisition device obtains the acquisition start instruction, the acquisition of the ambient light is begun to be executed. As the ambient light analysis device such as a smart mobile phone has been popularized currently, a user already has considerable operation experience in the smart mobile phone, so that the user can proficiently connect the ambient light analysis device with the ambient light acquisition device by the wired approach, and can operate the ambient light acquisition device through the ambient light analysis device.

For instance, the acquisition start instruction may include information about a type of the ambient light to be acquired, so that the ambient light acquisition device can acquire the type of the ambient light preset by the user, and hence the pertinence of ambient light acquisition can be improved.

In embodiments of the present disclosure, the ambient light acquisition device may be operated through a client APP on a mobile terminal which serves as the ambient light analysis device, and the user may select a plurality of control parameters such as a type of the ambient light to be acquired and an acquisition time of the ambient light through the client APP. Compared with the professional ambient light acquisition device, the ambient light acquisition method provided by the embodiments of the present disclosure has the advantage of quick start.

In other embodiments of the present disclosure, a special start button may also be set on the ambient light acquisition device, and the start button is operated to cause the ambient light acquisition device to begin execution of the ambient light acquisition.

In embodiments of the present disclosure, the ambient light acquisition device further comprises a sleep wakeup module 111; and before the parameter acquisition module acquires the ambient light parameter of the target area, the sleep wakeup module is configured to determine whether the ambient light acquisition device is in the sleep state; if so, wake up the ambient light acquisition device and subsequently adopt the parameter acquisition module to acquire the ambient light parameter; and if not, directly acquire the ambient light parameter through the parameter acquisition module.

The ambient light acquisition device may be set to automatically enter the sleep state when not used within a predetermined duration; or the user manually controls the ambient light acquisition device to enter the sleep state.

In embodiments of the present disclosure, after the acquisition start instruction is acquired through the instruction acquisition module 110, the state of the ambient light acquisition device is determined through the sleep wakeup module 111, and the ambient light acquisition device in the sleep state is waken up, so as to avoid the startup latency caused by sleep of the device from affecting the user experience.

In embodiments of the present disclosure, the ambient light acquisition device may only comprise the sleep wakeup module 111, the parameter acquisition module 112, the parameter conversion module 114 and the parameter sending module 116. The ambient light acquisition device does not need to be started just after the acquisition of the acquisition start instruction. For instance, periodical startup for the ambient light acquisition device may be set, and the ambient light parameter may be directly acquired through the parameter acquisition module after each startup.

In embodiments of the present disclosure, the ambient light acquisition device further comprises a sleep module 118 which is configured to: control the ambient light acquisition device to enter the sleep state. After finishing the ambient light acquisition operation each time, the ambient light acquisition device automatically enters the sleep state, so that the energy consumption of the device can be reduced.

In other embodiments of the present disclosure, the ambient light acquisition device may also not comprise the sleep module 118, so that the ambient light acquisition device will not automatically enter the sleep state and can be on call at any time.

In embodiments of the present disclosure, the ambient light acquisition device further comprises a power detection module which is configured to:

determine whether the remaining power of the ambient light acquisition device is lower than a preset power threshold;

if so, generate a charging request instruction; and send the charging request instruction to the ambient light analysis device through the wired communication route.

Subsequently, the ambient light analysis device supplies power for the ambient light acquisition device through the wired communication route, so as to ensure the working duration of the ambient light acquisition device.

In embodiments of the present disclosure, the sleep wakeup module 111, the parameter acquisition module 112, the parameter conversion module 114, the parameter sending module 116 and the sleep module 118 described above may all be integrated into the main body 11.

Figure 4:
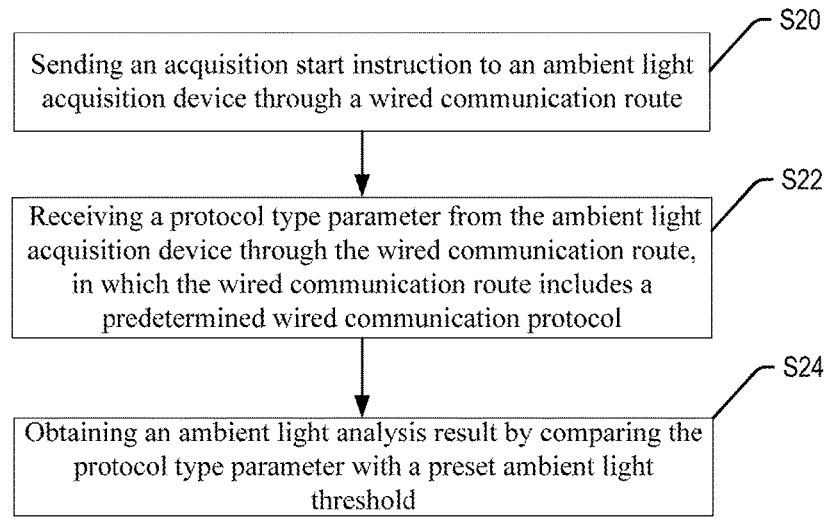
FIG. 4 is a flow diagram of an ambient light analysis method provided by an embodiment of the present disclosure.

FIG. 4 is a flow diagram of an ambient light analysis method provided by an embodiment of the present disclosure. An execution entity of the analysis method may be the foregoing ambient light analysis device 20.

At S22, the method may include receiving a protocol type parameter from the ambient light acquisition device through the wired communication route, in which the wired communication route includes a predetermined wired communication protocol.

According to the foregoing ambient light acquisition method, the protocol type parameter is converted from the ambient light parameter by the ambient light acquisition device according to the wired communication protocol. The protocol type parameter includes at least one of a luminous intensity parameter, a color temperature parameter and/or a color parameter that conform with the predetermined wired communication protocol.

Similarly, the predetermined wired communication protocol includes a headphone interface protocol, a USB interface protocol or another communication protocol, including a lightning interface protocol.

Taking the headphone interface protocol as an example, the ambient light analysis device obtains the protocol type parameter conforming to the headphone interface protocol, namely an audio signal parameter, through a headphone jack of the ambient light analysis device. As the wired communication route has the advantage of stable signal transmission, the data transmission between the ambient light acquisition device and the ambient light analysis device can be guaranteed, and a restrictive requirement on the transmission environment in a process of data transmission through a wireless communication route such as WIFI and Bluetooth can be avoided.

Meanwhile, as a headphone plug line has a simple structure and low production cost, the production cost of the ambient light acquisition device can be greatly reduced. Preferably, the headphone interface protocol may be a 3.5 mm headphone interface protocol widely applied in the industry, so that the ambient light acquisition device can be matched and used with multiple types of ambient light analysis devices.

At S24, the method may include obtaining an ambient light analysis result by comparing the protocol type parameter with a preset ambient light threshold.

In embodiments of the present disclosure, the preset ambient light threshold is set according to user needs. For instance, when the user is sensitive to color, the color parameter in the preset ambient light threshold may be set to be in a moderate range. In another example, when the user is sensitive to the luminous intensity, the luminous intensity parameter in the preset ambient light threshold may be set to be in a small range.

The ambient light analysis result may only reflect a comparison result of the protocol type parameter and the preset ambient light threshold. For instance, if the protocol type parameter exceeds the preset ambient light threshold, the ambient light analysis result may reflect that a current illumination environment is poor.

As the ambient light analysis device such as the smart mobile phone has been very popularized currently and has strong data calculation capability, a processor of the ambient light analysis device may be adopted to compare the protocol type parameter with the preset ambient light threshold, and the ambient light analysis result is displayed through a client APP on a mobile terminal taken as the ambient light analysis device. Compared with the professional ambient light analysis device, the ambient light analysis method provided by the embodiments of the present disclosure has the advantage of quick start.

In embodiments of the present disclosure, the ambient light analysis method further comprises the following step before the step S22. First, at S20, the method may include sending an acquisition start instruction to the ambient light acquisition device through the wired communication route. The user may operate the ambient light acquisition device through the ambient light analysis device through the step S20, and a resultant effect may be understood with reference to the description in the step S10.

Similarly, the acquisition start instruction includes information about the type of the ambient light to be acquired.

In embodiments of the present disclosure, the ambient light analysis method further comprises the following steps:

acquiring a charging request instruction which is sent by the ambient light acquisition device through the wired communication route; and sending a power supply current to the ambient light acquisition device through the wired communication route.

Subsequently, the ambient light analysis device supplies power for the ambient light acquisition device through the wired communication route, so as to ensure the working duration of the ambient light acquisition device.

Figure 5:
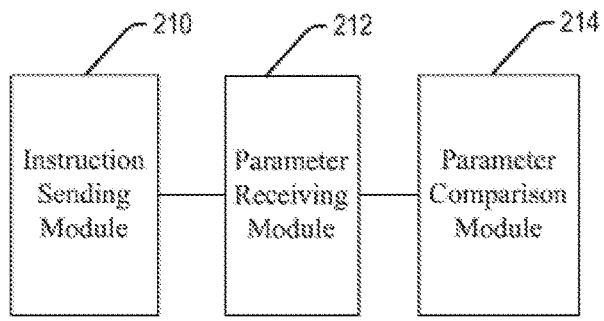
FIG. 5 is a block diagram of an ambient light analysis device provided by an embodiment of the present disclosure.

FIG. 5 is a block diagram of an ambient light analysis device provided by an embodiment of the present disclosure. The ambient light analysis device 20 may comprise the following modules.

A parameter receiving module 212 is configured to receive a protocol type parameter from an ambient light acquisition device through a wired communication route, in which the wired communication route includes a predetermined wired communication protocol.

According to the foregoing ambient light acquisition method, the protocol type parameter is converted from the ambient light parameter by the ambient light acquisition device according to the wired communication protocol. The protocol type parameter includes at least one of a luminous intensity parameter, a color temperature parameter or a color parameter that are in accord with the predetermined wired communication protocol.

Similarly, the predetermined wired communication protocol includes a headphone interface protocol, a USB interface protocol or a lightning interface protocol.

Taking the headphone interface protocol as an example, the ambient light analysis device obtains the protocol type parameter conforming to the headphone interface protocol, namely an audio signal parameter, through a headphone jack of the ambient analysis device. As the wired communication route has the advantage of stable signal transmission, the data transmission between the ambient light acquisition device and the ambient light analysis device can be guaranteed, and a harsh requirement on a transmission environment during a process of data transmission through a wireless communication route such as WIFI and Bluetooth can be avoided. Meanwhile, as a headphone cord has a simple structure and low production cost, the production cost of the ambient light acquisition device can be greatly reduced. Preferably, the headphone interface protocol may be a 3.5 mm headphone interface protocol widely applied in the industry, so that the ambient light acquisition device can be matched and used with multiple types of ambient light analysis devices.

A parameter comparison module 214 is configured to compare the protocol type parameter with the preset ambient light threshold, and obtain an ambient light analysis result.

In embodiments of the present disclosure, the preset ambient light threshold is set according to user needs. For instance, when the user is sensitive to color, the color parameter in the preset ambient light threshold may be set to be in a moderate range. In another example, when the user is sensitive to the luminous intensity, the luminous intensity parameter in the preset ambient light threshold may be set to be in a small range.

The ambient light analysis result may only reflect a comparison result of the protocol type parameter and the preset ambient light threshold. For instance, if the protocol type parameter exceeds the preset ambient light threshold, the ambient light analysis result may reflect a poor current illumination environment.

As the ambient light analysis device such as a smart mobile phone has been popularized currently and has strong data calculation capability, a processor of the ambient light analysis device may be adopted to compare the protocol type parameter with the preset ambient light threshold, and the ambient light analysis result is displayed through a client APP on a mobile terminal taken as the ambient light analysis device. Compared with the professional ambient light analysis device, the ambient light analysis method provided by the embodiments of the present disclosure has the advantage of quick start.

In embodiments of the present disclosure, the ambient light analysis device further comprises an instruction sending module 210 which is configured to: send an acquisition start instruction to the ambient light acquisition device through the wired communication route. The user may operate the ambient light acquisition device through the ambient light analysis device by adoption of the instruction sending module 210, and the resultant effect may be referred to with the work flow of the foregoing parameter acquisition module 10.

Similarly, the acquisition start instruction includes information about the type of the ambient light to be acquired.

In embodiments of the present disclosure, the ambient light analysis device further comprises a charging management module which is configured to:

acquire a charging request instruction which is sent by the ambient light acquisition device through the wired communication route; and send the power supply current to the ambient light acquisition device through the wired communication route.

Subsequently, the ambient light analysis device supplies power for the ambient light acquisition device through the wired communication route, so as to ensure the working duration of the ambient light acquisition device.

Figure 6:
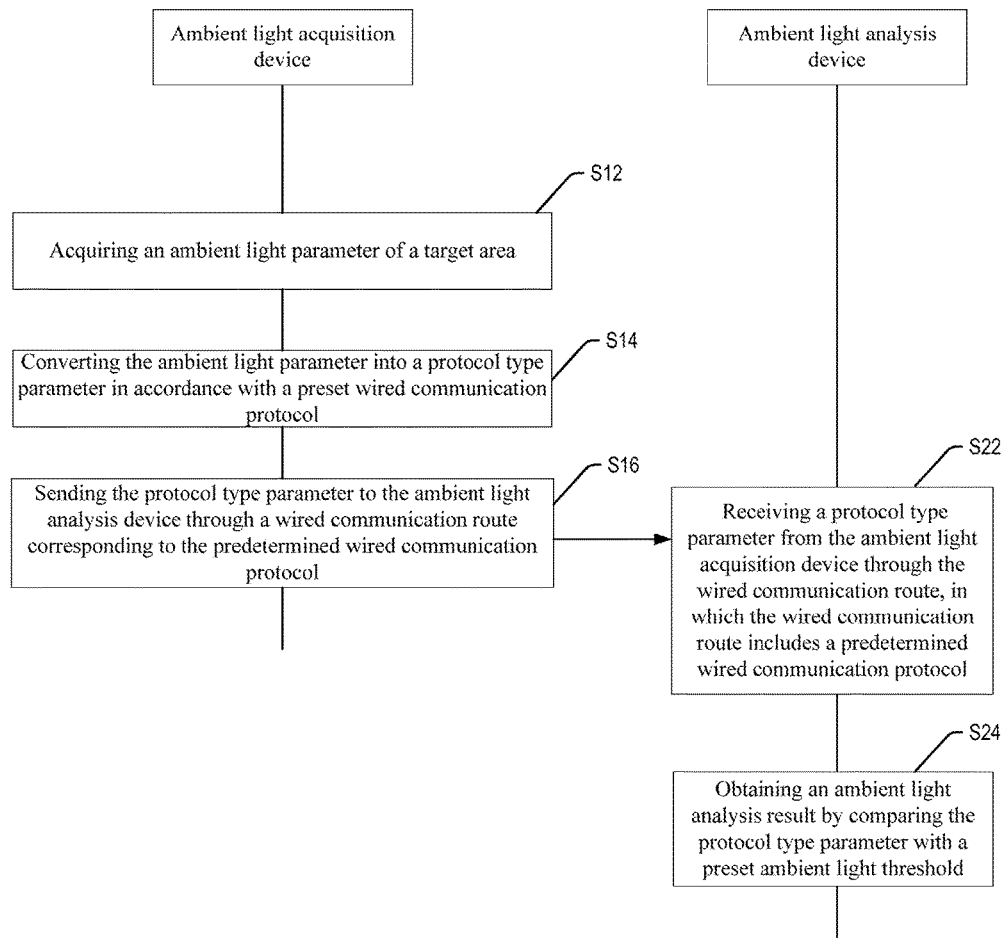
FIG. 6 is a flow diagram of an ambient light detection method provided by an embodiment of the present disclosure.

FIG. 6 is a flow diagram of an ambient light detection method provided by an embodiment of the present disclosure. The detection method is formed by the ambient light acquisition method and the ambient light analysis method. An execution entity of the detection method also includes the ambient light acquisition device 10 and the ambient light analysis device 20.

In embodiments of the present disclosure, the ambient light detection method specifically comprises the following steps. First, at S12, the method may include acquiring, by the ambient light acquisition device, an ambient light parameter of a target area. Then, at S14, the method may include converting, by the ambient light acquisition device, the ambient light parameter into a protocol type parameter in accordance with a wired communication protocol. At S16, the method may include sending, by the ambient light acquisition device, the protocol type parameter to the ambient light analysis device through the wired communication route. At S22, the method may include acquiring, by the ambient light analysis device, the protocol type parameter through the wired communication route connected with the ambient light analysis device. At S24, the method may include comparing, by the ambient light analysis device, the protocol type parameter with a preset ambient light threshold, and obtaining an ambient light analysis result. To this end, the ambient light detection method may be used to integrate the ambient light acquisition method and the ambient light analysis method.

In other embodiments of the present disclosure, the ambient light detection method may also be adjusted according to the ambient light acquisition method in FIG. 1 and the ambient light analysis method in FIG. 3. For instance, the present disclosure may add the step S10 in the ambient light acquisition method.

Figure 7:
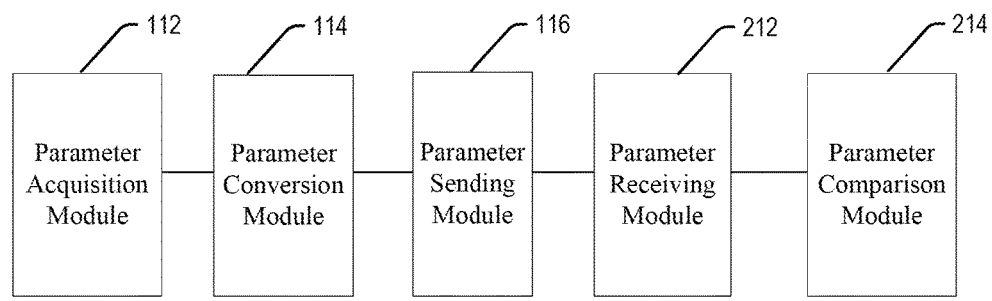
FIG. 7 is a block diagram of an ambient light detection system provided by an embodiment of the present disclosure.

FIG. 7 is a block diagram of an ambient light detection system provided by an embodiment of the present disclosure.

In embodiments of the present disclosure, the detection system may include the following components. An ambient light acquisition device including: a parameter acquisition module 112 configured to acquire an ambient light parameter of a target area; a parameter conversion module 114 configured to convert the ambient light parameter into a protocol type parameter in accordance with a predetermined wired communication protocol; and a parameter sending module 116 configured to send the protocol type parameter to an ambient light analysis device through a wired communication route corresponding to the predetermined wired communication protocol. The ambient light analysis device may also include: a parameter receiving module 212 configured to receive the protocol type parameter from the ambient light acquisition device through the wired communication route, in which the wired communication route includes the predetermined wired communication protocol; and a parameter comparison module 214 configured to compare the protocol type parameter with a preset ambient light threshold, and obtain an ambient light analysis result. To this end, the ambient light detection system may integrate the ambient light acquisition device 10 and the ambient light analysis device 20.

In other embodiments of the present disclosure, the ambient light detection system may also be adjusted according to the structure of the ambient light acquisition device in FIG. 3 and the structure of the mobile device in FIG. 5. For instance, in some configurations, an instruction acquisition module 10 may be added in the ambient light acquisition device.

In summary, as it can be seen from the technical proposals of the embodiments of the present disclosure, in the embodiments of the present disclosure the acquired ambient light parameter is sent to the ambient light analysis device through the wired communication route, so that the transmission stability of the ambient light parameter can be achieved regardless of the surrounding electromagnetic environment; and meanwhile, the cost of the wired communication route is low, so that the production cost of relevant devices can be reduced.

The present disclosure provides methods for ambient light acquisition and analysis and their corresponding devices, which detect ambient light with low cost and high stability.

An ambient light acquisition method is provided, which may include:

acquiring an ambient light parameter of a target area;

converting the ambient light parameter into a protocol type parameter in accordance with a predetermined wired communication protocol; and transmitting the protocol type parameter to an ambient light analysis device through a wired communication route corresponding to the predetermined wired communication protocol.

Further, the ambient light parameter may include at least one of a luminous intensity parameter, a color temperature parameter or a color parameter.

Further, the predetermined wired communication protocol includes a headphone interface protocol, a universal serial bus (USB) interface protocol or a lightning interface protocol.

Further, the headphone interface protocol includes a 3.5 mm headphone interface protocol.

Further, before acquiring the ambient light parameter of the target area, the ambient light acquisition method further includes:

determining whether the ambient light acquisition device is in a sleep state; and if so, waking up the ambient light acquisition device.

Further, before acquiring the ambient light parameter of the target area, the ambient light acquisition method further includes:

obtaining an acquisition start instruction from the ambient light analysis device through the wired communication route.

Further, the acquisition start instruction includes information about a type of the ambient light to be acquired.

Further, after transmitting the protocol type parameter to the ambient light analysis device through the wired communication route, the ambient light acquisition method further includes:

controlling the ambient light acquisition device to enter the sleep state.

Further, the ambient light acquisition method further includes:

determining whether remaining power of the ambient light acquisition device is lower than a preset power threshold;

if so, generating a charging request instruction; and sending the charging request instruction to the ambient light analysis device through the wired communication route.

An ambient light acquisition device is provided, which may include:

a parameter acquisition circuit configured to acquire an ambient light parameter of a target area;

a parameter conversion circuit configured to convert the ambient light parameter into a protocol type parameter in accordance with a predetermined wired communication protocol; and a parameter sending circuit configured to send the protocol type parameter to the ambient light analysis device through a wired communication route corresponding to the predetermined wired communication protocol.

Further, the ambient light parameter includes at least one of a luminous intensity parameter, a color temperature parameter or a color parameter.

Further, the predetermined wired communication protocol includes a headphone interface protocol, a USB interface protocol or a lightning interface protocol.

Further, the ambient light acquisition device further includes an instruction acquisition circuit; and before the parameter acquisition circuit acquires the ambient light parameter of the target area, the instruction acquisition circuit is specifically configured to:

acquire an acquisition start instruction from the ambient light analysis device through the wired communication route.

An ambient light analysis method is provided, which may include:

receiving a protocol type parameter from an ambient light acquisition device through a wired communication route, the wired communication route including a predetermined wired communication protocol; and obtaining an ambient light analysis result by comparing the protocol type parameter with a preset ambient light threshold.

Further, the protocol type parameter includes at least one of a luminous intensity parameter, a color temperature parameter or a color parameter in accord with the predetermined wired communication protocol.

Further, the predetermined wired communication protocol includes a headphone interface protocol, a USB interface protocol or a lightning interface protocol.

Further, the headphone interface protocol includes a 3.5 mm headphone interface protocol.

Further, before receiving the protocol type parameter from the ambient light acquisition device through the wired communication route, the ambient light analysis method may further include:

sending an acquisition start instruction to the ambient light acquisition device through the wired communication route.

Further, the acquisition start instruction includes information about a type of the ambient light to be acquired.

An ambient light analysis device is provided, which may include:

a parameter receiving circuit configured to receive a protocol type parameter from an ambient light acquisition device through a wired communication route, the wired communication route including a predetermined wired communication protocol; and a parameter comparison circuit configured to obtain an ambient light analysis result by comparing the protocol type parameter with a preset ambient light threshold.

As it can be seen from the technical solutions provided by embodiments of the present disclosure, in the embodiments of the present disclosure an acquired ambient light parameter is sent to the ambient light analysis device through a wired communication route, so that transmission stability of the ambient light parameter can be guaranteed regardless of a surrounding electromagnetic environment; and meanwhile, a cost of the wired communication route is low, and a production cost of relevant devices can be reduced.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing is only the embodiments of the present disclosure and not intended to limit the present disclosure. Various modifications and changes may be made to the present disclosure by those skilled in the art. Any modification, equivalent replacement, improvement or the like made within the spirit and the principle of the present disclosure shall fall within the scope of protection of the appended claims.

What is claimed is:

1. An ambient light acquisition method, comprising:
   acquiring, by a sensor, an ambient light parameter of a target area;
   converting the ambient light parameter into a protocol type parameter in accordance with a predetermined wired communication protocol, wherein the protocol type parameter comprises an audio signal parameter that conforms to a headphone interface protocol, and the headphone interface protocol comprises a wired communication route for transmitting the protocol type parameter; and
   transmitting the protocol type parameter to an ambient light analysis device through the wired communication route corresponding to the predetermined wired communication protocol, wherein the wired communication route comprises an audio data transmission route comprising a headphone plug coupled to a headphone jack.

2. The ambient light acquisition method according to claim 1, wherein the ambient light parameter comprises at least one of a luminous intensity parameter, a color temperature parameter and a color parameter.

3. The ambient light acquisition method according to claim 1, wherein the predetermined wired communication protocol comprises the headphone interface protocol, a universal serial bus (USB) interface protocol or a lightning interface protocol.

4. The ambient light acquisition method according to claim 3, wherein the headphone interface protocol comprises a 3.5 mm headphone interface protocol.

5. The ambient light acquisition method according to claim 1, wherein, before acquiring the ambient light parameter of the target area, the ambient light acquisition method further comprises:
   determining whether the ambient light acquisition device is in a sleep state; and
   if so, waking up the ambient light acquisition device.

6. The ambient light acquisition method according to claim 1, wherein, before acquiring the ambient light parameter of the target area, the ambient light acquisition method further comprises:

obtaining an acquisition start instruction from the ambient light analysis device through the wired communication route.

7. The ambient light acquisition method according to claim 5, wherein the acquisition start instruction comprises information about a type of the ambient light to be acquired.

8. The ambient light acquisition method according to claim 1, wherein, after transmitting the protocol type parameter to the ambient light analysis device through the wired communication route, the ambient light acquisition method further comprises:

controlling the ambient light acquisition device to enter the sleep state.

9. The ambient light acquisition method according to claim 1, wherein the ambient light acquisition method further comprises:

determining whether remaining power of the ambient light acquisition device is lower than a preset power threshold;

if so, generating a charging request instruction; and sending the charging request instruction to the ambient light analysis device through the wired communication route.

10. An ambient light acquisition device, comprising:

a parameter acquisition circuit configured to acquire, by a sensor, an ambient light parameter of a target area;

a parameter conversion circuit configured to convert the ambient light parameter into a protocol type parameter in accordance with a predetermined wired communication protocol, wherein the protocol type parameter comprises an audio signal parameter that conforms to a headphone interface protocol, and the headphone interface protocol comprises a wired communication route for transmitting the protocol type parameter; and a parameter sending circuit configured to send the protocol type parameter to the ambient light analysis device through the wired communication route corresponding to the predetermined wired communication protocol, wherein the wired communication route comprises an audio data transmission route comprising a headphone plug coupled to a headphone jack.

11. The ambient light acquisition device according to claim 10, wherein the ambient light parameter comprises at least one of a luminous intensity parameter, a color temperature parameter or a color parameter.

12. The ambient light acquisition device according to claim 10, wherein the predetermined wired communication protocol comprises the headphone interface protocol, a USB interface protocol or a lightning interface protocol.

13. The ambient light acquisition device according to claim 10, wherein the ambient light acquisition device further comprises an instruction acquisition circuit; and before the parameter acquisition circuit acquires the ambient light parameter of the target area, the instruction acquisition circuit is configured to:

acquire an acquisition start instruction from the ambient light analysis device through the wired communication route.

14. An ambient light analysis device, comprising:

a parameter receiving circuit configured to receive a protocol type parameter from an ambient light acquisition device through a wired communication route, the wired communication route including a predetermined wired communication protocol, wherein the protocol type parameter comprises an audio signal parameter that conforms to a headphone interface protocol, and the headphone interface protocol comprises a wired communication route for transmitting the protocol type parameter and the wired communication route comprises an audio data transmission route comprising a headphone plug coupled to a headphone jack; and a parameter comparison circuit configured to obtain an ambient light analysis result by comparing the protocol type parameter with a preset ambient light threshold.

15. The ambient light analysis device according to claim 14, wherein the protocol type parameter comprises at least one of a luminous intensity parameter, a color temperature parameter and a color parameter in accord with the predetermined wired communication protocol.

16. The ambient light analysis device according to claim 14, wherein the predetermined wired communication protocol comprises the headphone interface protocol, a USB interface protocol or a lightning interface protocol.

17. The ambient light analysis device according to claim 16, wherein the headphone interface protocol comprises a 3.5 mm headphone interface protocol.

18. The ambient light analysis device according to claim 14, wherein ambient light analysis device receives an acquisition start instruction through the wired communication route.

19. The ambient light analysis device according to claim 14, wherein the acquisition start instruction comprises information about a type of the ambient light to be acquired.

20. The ambient light analysis device according to claim 14, wherein the preset ambient light threshold is a range of luminous intensity.

* * * * *